April 30, 1968 A. J. PETERSEN 3,380,929
STANDARD GAS SOLUTION
Filed April 27, 1965
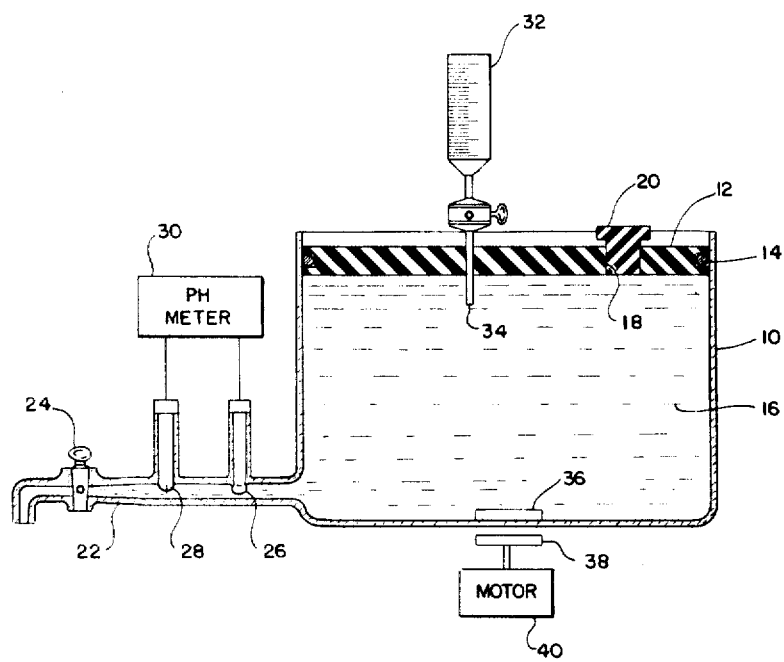
INVENTOR.
ARNE J. PETERSEN
BY
ATTORNEY

United States Patent Office 3,380,929
Patented Apr. 30, 1968

3,380,929
STANDARD GAS SOLUTION
Arne J. Petersen, Balboa, Calif., assignor to Beckman Instruments, Inc., a corporation of California
Filed Apr. 27, 1965, Ser. No. 451,286
15 Claims. (Cl. 252—408)

ABSTRACT OF THE DISCLOSURE

A standard $P_{co_2}$ solution for calibration of carbon dioxide measuring instruments. The solution is produced by reacting known amounts and concentrations of reactants in a closed container in which the headspace above the solution in the container is eliminated so that the $P_{co_2}$ of the solution in the container is maintained at a predetermined value. Wetting and thickening agents may be added to this solution to simulate the viscosity and surface tension of blood.

---

This invention relates generally to a standard gas solution and method of making the same and, more particularly, to a solution having a known amount of dissolved carbon dioxide therein and to a method of producing such a solution.

Most instruments utilized in the measurement of dissolved carbon dioxide require calibration with solutions having a known partial pressure of carbon dioxide, that is, $P_{co_2}$. Such calibration is particularly important in the measurement of $P_{co_2}$ in blood when accurate measurements of $P_{co_2}$ and pH are required as an indication of the condition of a patient's metabolism. It is the standard procedure today for producing standard $P_{co_2}$ solutions to bubble gases of varying percentages through a solution, usually water, to achieve liquid samples of known $P_{co_2}$. This technique usually requires large and cumbersome and sometimes dangerous high pressure steel tanks or bottles of gases, which are expensive if specific and accurate mixtures or percentages are required. Furthermore, the conventional method is dependent upon the ratio of the pressure of the gas entering the container through which the gas is bubbled to the pressure outside of the container, to the atmospheric pressure surrounding the container and the temperature of the environment. Therefore, the conventional method is subject to numerous variations which might affect the accuracy of the partial pressure of $CO_2$ in the solution obtained by this method.

It is, therefore, the principal object of the present invention to provide a standard gas solution which is produced by chemical reaction and does not require the cumbersome and sometimes dangerous equipment used in the conventional method of producing standard gas solutions.

Another object of the invention is to provide a standard $P_{co_2}$ solution which is simple and inexpensive to produce and is extremely accurate.

According to the principal aspect of the present invention, a solution having a predetermined amount of dissolved gas therein is produced by a chemical reaction between two reactants which are present in an amount determined by Henry's Law to produce said predetermined amount of dissolved gas when reacted in an aqueous solution.

According to another aspect of the present invention, a standard $P_{co_2}$ solution is produced by a chemical reaction based upon both Henry's Law and the dissociation constant of carbonic acid, so that a stable $P_{co_2}$ solution may be produced having a predetermined hydrogen ion concentration. Consequently, by this method a solution may be produced having a $P_{co_2}$ and pH simulating that of blood or other solutions so that instruments for measuring the $P_{co_2}$ of these solutions may be accurately calibrated.

Other objects, aspects and advantages will become apparent from the following description taken in connection with the accompanying drawing in which there is shown, in partial cross-section, a suitable apparatus for producing a standard $P_{co_2}$ solution in accordance with the invention.

In accordance with one feature of the invention, a standard $P_{co_2}$ solution is produced by mixing a predetermined amount of a bicarbonate solution with a relatively strong acid in sufficient quantity to completely convert the bicarbonate into $CO_2$ which dissolves in the aqueous solution. The amount of the bicarbonate used is determined from Henry's Law to produce the desired amount of $P_{co_2}$. For example, if sodium bicarbonate and hydrochloric acid in an excess amount are mixed, the following reaction occurs:

(1)  $NaHCO_3 + HCl \text{ (excess)} \rightarrow CO_2 + NaCl + H_2O$

In order to produce a known amount of $P_{co_2}$ from the above reaction, an amount of $NaHCO_3$ is selected by utilizing Henry's Law. From Henry's Law:

(2)  $$P = KX$$

where P is the partial pressure of $CO_2$ in mm. of mercury, K is Henry's constant of equality in mm./mole fraction and X is the mole fraction of $CO_2$ which, from the reaction in Equation 1, may be expressed as:

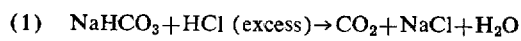

(3)  $$X = \frac{nCO_2}{nCO_2 + nH_2O}$$

Since $nCO_2$ is equal to about $10^{-3}$ M and $nH_2O$ is equal to about 55.5 M at room temperature, it can be seen that the effect of $nCO_2$ in the denominator of Equation 3 is insignificant. Therefore, $nCO_2$ may be cancelled from Equation 3 so that:

(4)  $$X = \frac{nCO_2}{nH_2O}$$

From Equation 1 it is seen that $nCO_2$ is directly proportional to $nNaHCO_3$. Therefore, Equation 4 may be rewritten as:

(5)  $$X = \frac{nNaHCO_3}{nH_2O}$$

By substituting Equation 5 into Equation 2, we find that:

(6)  $$nNaHCO_3 = \frac{nH_2O \cdot P}{K}$$

Therefore, if it is desired, for example, to provide a standard $P_{co_2}$ solution having a partial pressure of 95 mm. of mercury at biological temperatures, about 38° C., where K is $.168 \times 10^{+7}$, by using Equation 6, it can be determined that $3.14 \times 10^{-3}$ moles/liter of $NaHCO_3$ are required to be acidified with an excess of HCl.

In stating that the sodium bicarbonate is acidified with an excess of HCl, it is meant that there must be a sufficient amount of acid to completely convert the bicarbonate to $CO_2$. In other words, there must be sufficient acid to drive the reaction (1) completely to the right by the law of mass action. As a practical matter, this requires that the acid must be at least 100 times stronger in concentration than the bicarbonate.

Although hydrochloric acid has been described as a suitable acid for use in the above method, it is to be understood that other strong acids, that is, those which almost completely dissociate in water, may be utilized, for example, sulfuric acid or nitric acid. Furthermore, bicarbonates other than sodium bicarbonate may be used, for example, potassium or lithium bicarbonates.

In the preferred method of producing a standard $P_{co_2}$ solution in accordance with the above reaction and equations, an amount of bicarbonate determined by Equation 6 is dissolved in a known amount of an aqueous solution, normally one liter of distilled water, in a flexible container. Thereafter, the container is closed except for a small vent and the container is compressed to expel any air above the bicarbonate solution in the container through the vent. Then the vent is sealed and an excess amount of a strong acid is inserted into the container by means of a syringe by forcing the needle through the sealed vent, while the container is still compressed, so that the solution within the container is not exposed to the atmosphere. This is an important feature in that if the acid were added to the bicarbonate solution while exposed to the atmosphere, the $CO_2$ produced by reaction (1) would escape to the atmosphere rather than becoming dissolved in the solution. While the acid is supplied to the interior of the container by the syringe, the compressive force applied to the container is relieved to accommodate the increased volume of solution in the container. Consequently, after the acid is completely delivered to the container, there is virtually no headspace, that is, body of gas above the solution in the container. Hence, all the $CO_2$ produced by the reaction of the bicarbonate with the acid becomes dissolved in the solution. After the acid has been added to the solution by the syringe, the syringe is withdrawn from the flexible container, which will normally result in the opening formed by the needle closing by itself. However, if this does not occur the opening may be sealed in any conventional manner.

An important application for the present invention is the use of the standard $P_{CO_2}$ solution for calibrating a $P_{CO_2}$ measuring instrument in the field of blood analysis. In such applications, the sensor of the $P_{CO_2}$ measuring instrument is generally mounted in a flow cell such as shown in U.S. Patent No. 3,151,052 and has its sensing tip opening into a small cannula passing through the cell which carries the blood sample. To utilize the standard $P_{CO_2}$ solution described above, a needle of a syringe is inserted through the wall of the container to withdraw the standard solution therefrom, so that the solution is not exposed to the atmosphere. Then the needle of the syringe is positioned at the end of the cannula of the flow cell and the syringe actuated to force the standard solution through the cannula whereby the $CO_2$ sensor may be calibrated.

A standard solution calculated as having a $P_{CO_2}$ of 95 mm. produced by reacting $3.14 \times 10^{-3}$ moles/liter of $NaHCO_3$ with an excess of HCl, has been tested in a flow cell having a $CO_2$ measuring instrument as described above. The instrument responded with a reading of 97 mm. of $CO_2$. Consequently, it is seen that the standard solution had a $P_{CO_2}$ essentially the same as that determined by Henry's Law.

When using the standard solution of this invention for calibrating instruments intended to measure the $P_{CO_2}$ of blood, it is advantageous to add a thickening agent to the solution to simulate the viscosity of blood. For this purpose, about 0.25 to 1% by weight of carboxy-methylcellulose may be added to the standard solution whereby the solution will have a viscosity similar to that of mammal blood. By the addition of the thickening agent, the solution is capable of pushing any bubbles out of the cannula in the flow cell which would otherwise collect about the $CO_2$ sensor and cause errors in the reading of the $CO_2$ measuring instrument. Also, a wetting agent such as Titron X-100 may be added to the solution to simulate the surface tension of blood.

Although the above method has been described specifically in connection with the production of a standard $P_{CO_2}$ solution, it is to be understood that other standard $P_{\text{gas}}$ solutions could be formed by relying upon Henry's Law, such as the formation of standard $P_{O_2}$ solutions from acidifying of hydrogen peroxide.

Although the above method is extremely simple and inexpensive and the solution produced thereby is highly accurate, the solution has the disadvantage that when the solution is withdrawn from the closed container a headspace is formed in the container into which some of the dissolved $CO_2$ may escape, thus altering the $P_{CO_2}$ of the solution. Also, since the dissolved $CO_2$ escapes from the solution when exposed to the atmosphere, the production of the solution must be closely controlled to keep the solution isolated from the atmosphere once the acid is added to the bicarbonate solution.

Therefore, according to a second feature of the invention, there is provided a different method for producing a standard $P_{CO_2}$ solution so that the solution is much more stable, that is, the dissolved $CO_2$ does not readily escape from the solution when the solution is exposed to the atmosphere and complete isolation of the solution during production is not essential. This method is based upon the chemical reaction of carbon dioxide with water to produce carbonic acid, and takes in consideration the dissociation constant of carbonic acid so that a stable $P_{CO_2}$ solution is provided. For the reaction:

(7) $\quad CO_2(\text{d.-g.}) + H_2O \rightleftharpoons H_2CO_3 \rightleftharpoons H^+ + HCO_3^-$ where $CO_2$ (d.-g.) symbolizes the dissolved gas of $CO_2$, the governing factor is the amount of $CO_2$ (d.-g.) present and not the water. Since the water is present in extremely large amounts in comparison to the $CO_2$ (d.-g.), water being about $10^5$ times greater than $CO_2$ (d.-g.), reaction (7) looks like a first order reaction with the formation of carbonic acid directly proportional to the amount of $CO_2$ (d.-g.) only.

The ionization constant ($K_A$) of $H_2CO_3 \rightleftharpoons H^+ + HCO_3^-$ is:

(8) $\quad K_A = \dfrac{(H^+)(HCO_3^-)}{(H_2CO_3)}$

Since $CO_2$ (d.-g.) is proportional to $(H_2CO_3)$, then:

(9) $\quad K_A = \dfrac{(H^+)(HCO_3^-)}{(CO_2\,(d.\text{-}g.))}$

It is generally recognized that $nCO_2$ equals $(CO_2\,(\text{d.-g.}))$ symbol-wise so that Equation 9 may be rewritten as:

(10) $\quad K_A = \dfrac{(H^+)(HCO_3^-)}{nCO_2}$

Therefore:

(11) $\quad nCO_2 = \dfrac{(H^+)(HCO_3^-)}{K_A}$

From Henry's Law:

(12) 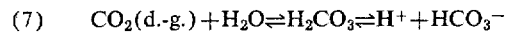

which may be simplified to:

(13) $\quad P_{CO_2} = K_H \dfrac{nCO_2}{nH_2O}$ since $nCO_2$ is insignificant as compared to $nH_2O$, as explained in connection with Equation 4.

By substituting Equation 11 into Equation 13:

(14) $\quad P_{CO_2} = K_H \dfrac{\left[\dfrac{(H^+)(HCO_3^-)}{K_A}\right]}{nH_2O}$ Therefore:

(15) $\quad P_{CO_2} = \dfrac{K_H (H^+)(HCO_3^-)}{K_A \cdot nH_2O}$

Since $P_{CO_2}$ is predetermined and, $K_H$, $K_A$ and $nH_2O$ are known then:

(16) $\quad (H^+)(HCO_3^-) = \dfrac{P_{CO_2} \cdot K_A \cdot nH_2O}{K_H}$

Therefore, the amount of bicarbonate required to be added to a solution having a known or adjusted pH is determined by the equation:

$$(17) \quad (HCO_3^-) = \frac{P_{co_2} \cdot K_A \cdot nH_2O}{K_H \cdot (H^+)}$$

where $(H^+)$ is the hydrogen ion activity of the solution as determined by the known or adjusted pH.

Therefore, if it is desired to produce a solution having a known amount of dissolved $CO_2$ therein, one merely needs to measure the pH of a known amount of aqueous solution and, by substituting that value in terms of ion activity and the values of $K_H$, $K_A$ and $nH_2O$ in Equation 17, the amount of bicarbonate required to produce the standard solution may be determined. Hence, by this method both the pH and the $P_{co_2}$ of a standard solution may be adjusted to a desired value, and the solution will be substantially stable. The stability with respect to the $P_{co_2}$ is obtained from the relatively large amount of bicarbonate added to the solution, in comparison to the amount added in the first method described hereinbefore. In other words, the standard $P_{co_2}$ solution has a buffer capacity with respect to the $P_{co_2}$ thus providing a more stable solution.

It is also desirable to provide a buffer for the pH of the solution, particularly if it is desired to produce a stable solution which simulates blood as far as $P_{co_2}$ and pH. For this purpose, a pH buffer in the form of a relatively weak acid may be added to a known amount of water and partially titrated with a base to obtain a desired pH level. hereafter, a bicarbonate in an amount determined by Equation 17 may be added to the water whereby the predetermined amount of $CO_2$ will be produced having an adjusted pH.

A convenient apparatus for producing a standard $P_{co_2}$ solution in accordance with this embodiment of the invention and which also could be used for producing the solution by the first method described above, is illustrated in the drawing. The apparatus comprises a cylindrical glass container 10 having a slidable piston 12 therein sealed to the sides of the container by an O-ring 14. As seen in the drawing, the piston floats on the surface of the solution 16 in the container so that no headspace will be developed above the solution if solution is removed from the container. An opening 18 is provided in the piston closed by a plug 20 which may be removed so that water or chemicals may be added to the container. Near the bottom of the container 10 is provided an outlet 22 having a control valve 24 therein for controlling the flow of standard solution into suitable receptacles from the container once the solution is produced. Mounted in the outlet 22 are a glass electrode 26 and reference electrode 28 both connected to a conventional pH meter 30. A burette 32 is mounted in an opening in the piston 12 having its outlet 34 terminating adjacent the upper portion of the piston. A stirrer is provided for the solution 16 which includes one magnet 36 in the container and a second magnet 38 rotated by a motor 40 whereby the second magnet causes the first magnet to rotate as well known in the art. As can be readily seen, the burette 32 together with the pH meter 30 and electrodes 26 and 28 provide a titration system which may be used to adjust the pH of the solution in the container 10.

In the preferred method of the invention, a pH buffer in the form of a weak acid, such as boric acid, phosphoric acid, benzoic acid or phenol, is added to water in the container so that the total amount of the acid and water is known, for example, one liter. In order to adjust the pH of the solution, after adding the acid buffer thereto, a hydroxide, such as sodium or potassium hydroxide, is delivered to the solution through the burette 32 until the predetermined pH is reached, as will be indicated by the pH meter 30. Thereafter, a bicarbonate, preferably in the form of a powder, is added to the container through the opening 18 by removing the plug 20. The amount of the bicarbonate will be determined from Equation 17 since the $P_{co_2}$ is predetermined, the $K_A$, $nH_2O$, and $K_H$ are constant for a particular temperature, and the hydrogen ion activity is determined by the pH of the solution. After the powder is added to the solution, the plug 20 is positioned to close the opening 18 so that no $CO_2$ may escape to the atmosphere. As a practical matter, since the reaction of the bicarbonate with the hydrogen ions in the solution is relatively slow, there is little or no loss of $P_{co_2}$ in the solution by way of $CO_2$ escaping to the atmosphere even if the plug 20 were not immediately positioned on the port 18. Furthermore, the piston 12 need not be used initially when the acid is added to the solution and titrated to adjust the pH, but as a practical matter, it is most convenient to perform the method with an apparatus as shown in the drawing with the piston in the container.

Although the pH of the solution is preferably adjusted by titration, it may also be adjusted by adjusting a monobasic salt with respect to an acid salt in the case of boric acid or adjusting a dibasic salt with respect to a monobasic salt in the case of the use of phosphoric acid as the buffer acid. In such case, the acid is delivered to the solution in the container 10 in a powder form and no titration is required.

The acid added to the solution to provide a pH buffer capacity should be of sufficient concentration so that the addition of bicarbonate to the solution does not materially affect the adjusted pH of the solution. In the case where the solution being produced is desired to simulate blood in $P_{co_2}$, the moles per liter of the acid should be equal to or more than the moles per liter of the bicarbonate. However, even if the concentration of acid is less than that value, for example, one-half as many moles per liter as the bicarbonate, the pH decrease is only about 0.2 pH and is measurable by the pH meter. Hence, if after adding the acid to the solution, titrating the solution to adjust the pH, and adding the bicarbonate to the solution as determined by Equation 17, any change in the pH of the solution occurs, the $P_{co_2}$ of the solution may be recalculated in accordance with Equation 15 taking in consideration the new pH value as measured by the pH meter 30.

The pH buffer capacity of the above solution provided by the weak acid added to the solution with the solution pH value adjusted to a desired level is of great importance when it is desired to produce a stable solution which has a pH and $P_{co_2}$ similar to that of blood yet retain the $P_{co_2}$ buffer capacity. This can be seen from the fact that there must be about 0.2 to 0.5 mole per liter of bicarbonate added to a solution to provide a good $P_{co_2}$ buffer capacity and have a $P_{co_2}$ close to that of blood, namely, about 40 to 80 mm. of mercury. In order to utilize this amount of bicarbonate and provide this level of $P_{co_2}$, according to Equations 15 to 17, the pH of the solution must be between about 8.9 and 8.1 at about 38° C., internal body temperature. It is noted, however, that this pH is somewhat greater than the pH of blood, which is normally about 7.4. It can therefore be appreciated that the pH value of the solution must be buffered so that it will not fall below about pH 8.1, if the $P_{co_2}$ buffer capacity of the solution is to be retained or else the $P_{co_2}$ will increase substantially over that found normally in blood. Hence, the optimum range of pH is between about 8.1 and 8.9 and bicarbonate is about 0.2 to 0.5 moles per liter in order to produce a solution having high $P_{co_2}$ buffer capacity, a $P_{co_2}$ simulating blood and a pH near that of blood. The aforementioned pH values, although high for blood, are sufficiently close to that normally encountered in blood for calibration purposes.

However, under some circumstances, it is desired to produce a standard solution having the same $P_{co_2}$ and pH of blood, which can only be obtained by sacrificing some of the $P_{co_2}$ buffer capacity of the solution. Hence, according to Equations 15 to 17, if a solution having a $P_{co_2}$ of about 40 to 80 mm. of mercury and a pH of about 7.4 is desired so as to closely simulate blood, then the moles per liter of bicarbonate must be decreased to the range of about 0.015 to 0.04. Since such a solution would not be so stable as that described above having 0.2 to 0.5 mole per liter of bicarbonate, it would preferably be packaged in small closed plastic vials and removed by a syringe for calibration purposes.

The buffering effect against changes in $P_{co_2}$ obtained by taking in consideration the dissociation constant of carbonic acid, in accordance with the above method, is of great advantage in that the losses due to the development of the headspace in the container for the standard solution, both in production or in normal usage of the solution, does not result in an appreciable change of the $P_{co_2}$ of the solution and is accountable. For example, with the bicarbonate ion at 0.3 mole per liter and the pH adjusted at 8.2, the $P_{co_2}$ at 38° C. is 77.2 mm. of mercury in accordance with the Equation 15 above. If a one-liter container of the solution is half used, then the headspace is 0.5 liter. With the partial pressure of the $CO_2$ in the headspace being in equilibrium with the partial pressure of $CO_2$ in the solution, still approximately 77 mm. of mercury, the amount of $CO_2$ required to fill this space is about $1.96 \times 10^{-3}$ moles of $CO_2$ in the gas phase. This $CO_2$ must be supplied to the headspace from the bicarbonate in the remaining 0.5 liter of solution. Consequently, there is left 0.148 mole of bicarbonate in the remaining 0.5 liter of solution or 0.296 mole per liter of $(HCO_3^-)$. The $P_{co_2}$ at this bicarbonate concentration calculates to be 76.1 mm. of mercury. This is a reduction of only 1.1 mm. of mercury due to the development of a headspace above and equal to the volume of the solution. Thus, it is seen that the change in the $P_{co_2}$ of the solution after half of the solution has been used is only about 1% less than that originally found in the solution and is accountable.

Numerous solutions have been produced in accordance with the Equations 15 to 17 including a partially titrated pH buffer with the result that the solution have been found to have a measured $P_{co_2}$ within ±2% or better of the values calculated from the aforementioned equations, the predominate source of error being the accuracy of the measuring instruments. An example of a specific composition is one containing 0.3 mole per liter of sodium bicarbonate, 0.2 mole per liter of boric acid titrated to pH 8.5 before the addition of sodium bicarbonate, and about 1% by weight of carboxy-methylcellulose to give the solution a viscosity similar to that of blood. A standard solution made in accordance with this invention with the above proportions of sodium bicarbonate and boric acid has a $P_{co_2}$ of 57 mm. of mercury at about 38° C. and a measured pH of 8.33 resulting from the addition of the bicarbonate to the original solution. This solution is particularly useful for calibration of $P_{co_2}$ measuring instruments intended to measure the $P_{co_2}$ of blood samples.

Although the method described wih respect to the apparatus illustrated in the drawing calls for the titration of the solution prior to the addition of the bicarbonate thereto, it is understood that the weak acid and bicarbonate may be mixed together in the solution initially and then the solution titrated to an adjusted pH. This method has the disadvantage over the previous method, however, in that the container 10 must be maintained completely sealed from the atmosphere since there is a greater hazard of $CO_2$ being lost to the atmosphere prior to adjusting the pH of the solution to the value required by the above equations than when the pH is adjusted prior to the addition of the bicarbonate to the solution.

Although several embodiments of the invention have been disclosed herein for purposes of illustration, it will be understood that various changes in the proportions and materials, as well as in the details of the described methods, may be made without departing from the spirit and scope of the invention as defined by the appended claims.

What is claimed is:

1. In a method of producing a solution containing a predetermined amount of dissolved $CO_2$, the steps comprising:
   dissolving a bicarbonate in a known amount of aqueous solution in a container with the bicarbonate being in an amount determined by Henry's Law to produce said predetermined amount of dissolved $CO_2$ when completely reacted with an inorganic acid that is at elast 100 times stronger in concentration than said bicarbonate;
   sealing said container to separate said solution from the atmosphere;
   eliminating the gas space above the solution in said container; and
   adding said acid to the solution in said container in a sufficient amount to completely convert said bicarbonate into $CO_2$, said acid being added to said solution while maintaining said solution separated from the atmosphere.

2. A method as set forth in claim 1 wherein said acid is selected from the group consisting of HCl, $H_2SO_4$ and $HNO_3$.

3. A method as set forth in claim 1 wherein said bicarbonate is selected from the group consisting of $NaHCO_3$, $KHCO_3$ and $LiHCO_3$.

4. In a method of producing a solution containing a predetermined amount of dissolved $CO_2$, the steps comprising:
   adjusting the pH of a known amount of an aqueous solution in a container to a predetermined level;
   closing said container to separate said solution from the atmosphere;
   eliminating the gas space above the solution in said container; and
   adding a bicarbonate to the solution in the container while maintaining said solution separated from the atmosphere, said bicarbonate being added in an amount determined by the equation:
$$(HCO_3^-) = \frac{P_{co_2} \cdot K_A \cdot nH_2O}{K_H(H^+)}$$
   where $P_{co_2}$ is said predetermined amount of dissolved $CO_2$ expressed in terms of partial pressure of $CO_2$, $K_A$ is the dissociation constant of $H_2CO_3$, $nH_2O$ is the number of moles of water, $K_H$ is Henry's Law constant of equality and $(H^+)$ is the hydrogen ion activity of the solution as determined by said predetermined pH level.

5. A method as set forth in claim 4 wherein said pH is adjusted by titrating the solution with a base.

6. In a method of producing a solution containing a predetermined amount of dissolved $CO_2$, the steps comprising:
   adding a pH buffer in the form of a relatively weak acid to a known amount of aqueous solution in a container;
   adjusting the pH of the solution to a predetermined level;
   closing said container to separate said solution from the atmosphere;
   eliminating the gas space above the solution in said container; and
   adding a bicarbonate to the solution in the container while maintaining said solution separated from the atmosphere, said bicarbonate being added in an amount determined by the equation:
$$(HCO_3^-) = \frac{P_{co_2} \cdot K_A \cdot nH_2O}{K_H(H^+)}$$
   where $P_{co_2}$ is said predetermined amount of dissolved $CO_2$ expressed in terms of partial pressure of $CO_2$, $K_A$ is the dissociation constant of $H_2CO_3$, $nH_2O$ is the number of moles of water, $K_H$ is Henry's Law constant of equality and ($H^+$) is the hydrogen ion activity of the solution as determined by said predetermined pH level.

7. A method as set forth in claim 6 wherein said acid is selected from the group consisting of boric acid, phosphoric acid, benzoic acid and phenol.

8. A method as set forth in claim 6 wherein said acid is selected from the group consisting of phosphoric acid, boric acid, benzoic acid and phenol.

9. In a method of producing a solution containing a predetermined amount of dissolved $CO_2$, the steps comprising:

adding a pH buffer in the form of a relatively weak acid and a predetermined amount of bicarbonate to a known amount of aqueous solution in a sealed container;

eliminating the gas space above the solution in said container; and adjusting the pH of said solution while in said sealed container to a level determined by the equation $$(H^+) = \frac{P_{co_2} \cdot K_A \cdot nH_2O}{K_H(HCO_3^-)}$$

where $P_{co_2}$ is said predetermined amount of dissolved $CO_2$ expressed in terms of partial pressure of $CO_2$, $K_A$ is the dissociation constant of $H_2CO_3$, $nH_2O$ is the number of moles of water, $K_H$ is Henry's Law constant of equality and ($HCO_3^-$) is the bicarbonate ion activity of the solution as determined by said predetermined amount of bicarbonate.

10. A method as set forth in claim 9 wherein said acid is selected from the group consisting of boric acid, phosphoric acid, benzoic acid and phenol.

11. In a method of producing a solution having a $P_{co_2}$ and pH approximating that generally encountered in blood, the steps comprising:

adding a pH buffer in the form of a relatively weak acid to a known amount of an aqueous solution in a container;

adjusting the pH of the solution to between about 8.1 and 8.9;

closing said container to separate said solution from the atmosphere;

eliminating the gas space above the solution in said container; and adding about 0.2 to 0.5 mole per liter of a bicarbonate to said solution while maintaining said solution separated from the atmosphere.

12. In a method of producing a solution having a $P_{co_2}$ and pH closely simulating that of blood, the steps comprising:

adding a pH buffer in the form of a relatively weak acid to a known amount of aqueous solution in a container;

adjusting the pH of the solution to about 7.4;

closing said container to separate the solution from the atmosphere;

eliminating the gas space above the solution in said container; and adding about 0.015 to 0.04 mole per liter of bicarbonate to said solution while maintaining said solution separated from the atmosphere.

13. In a method of producing a solution containing a predetermined amount of dissolved $CO_2$, the steps comprising:

adding a known amount of an aqueous solution to a container;

closing said container to separate said solution from the atmosphere;

eliminating the gas space above the solution in said container; and adding a bicarbonate to the solution in the container while maintaining said solution separated from the atmosphere, said bicarbonate being added in an amount determined by the equation:

$$(HCO_3^-) = \frac{P_{co_2} \cdot K_A \cdot nH_2O}{K_H(H^+)}$$

where $P_{co_2}$ is said predetermined amount of dissolved $CO_2$ expressed in terms of partial pressure of $CO_2$, $K_A$ is the dissociation constant of $H_2CO_3$, $nH_2O$ is the number of moles of water, $K_H$ is Henry's Law constant of equality and ($H^+$) is the hydrogen ion activity of the solution.

14. A closed container consisting essentially of a pH buffered standard solution having a partial pressure of $CO_2$ of 40 to 80 mm. of mercury, a pH of between about 7.4 to 8.9, and including a predetermined amount of a dissolved bicarbonate salt and thickening and wetting agents in sufficient amount to simulate the viscosity and surface tension of blood.

15. A closed container consisting essentially of pH buffered standard solution having a partial pressure of $CO_2$ of 40 to 80 mm. of mercury, a pH of between about 7.4 and 8.9, and containing a predetermined amount of a dissolved bicarbonate salt.

References Cited

UNITED STATES PATENTS 3,151,052  9/1964  Arthur et al. _____ 204—195

LEON D. ROSDOL, *Primary Examiner.*

MAYER WEINBLATT, *Assistant Examiner.*